Nov. 9, 1971 G. HOLL 3,618,264
BURRING DEVICE FOR TOOTHED WORKPIECES
Filed Dec. 3, 1968

INVENTOR
GÜNTER HOLL
BY Otto John Munz
ATTORNEY

United States Patent Office 3,618,264
Patented Nov. 9, 1971

3,618,264
BURRING DEVICE FOR TOOTHED WORKPIECES
Günter Holl, Kemptener-Strasse 29,
Lindau (Bodensee), Germany
Filed Dec. 3, 1968, Ser. No. 780,772
Claims priority, application Germany, Feb. 19, 1968,
P 16 52 799.4
Int. Cl. B23f 19/12
U.S. Cl. 51—95 GH                        3 Claims

ABSTRACT OF THE DISCLOSURE

This invention relates to a burring device for toothed workpieces, such as gear wheels or the like, of the kind comprising a profiled rotary tool having a cutting action and the axis of which is disposed horizontally, a support table for the workpiece to be burred, and an abutment for the workpiece.

---

In the manufacture of gear wheels or the like, it is unavoidable that burrs are produced on the end faces thereof. Elimination of the burrs presents certain difficulties. It is frequently attempted to eliminate the burrs by filing or sand-blasting, but this is only possible to a restricted degree owing to the need to maintain correct dimensions of the tooth flanks. With the device initially referred to, only two mutually adjacent teeth can be burred at a time, which is uneconomic.

Since obviously there has been a failure to recognise that the experience gained in burring internal contours can be applied analogously to the burring of gear wheels, that is by means of an appropriate construction of individual parts of the device, the underlying aim of the invention is to remedy this deficiency and to modify the known device in such a manner that gear wheels can be burred with it economically and in conformity with requirements.

Accordingly, the present invention consists in a burring device for toothed workpieces, such as gear wheels or the like, comprising a profiled rotary tool having a cutting action and the axis of which is disposed horizontally, a support table for the workpiece to be burred, and an abutment for the workpiece, wherein the abutment is constituted by a rack bar extending parallel to the axis of the rotary tool, said rack bar having on its side facing the gear wheel, a profile corresponding to the tooth system of the respective gear wheel, and having on its side facing the rotary tool, a profile corresponding to that of the rotary burring tool, the rack bar embracing the total profile of the rotary tool. With this device the gear wheel is laid on the support table and rolled manually along the rack bar, whereby all the teeth are burred consecutively, progressively and continuously. Since the rack bar constitutes a perfect guide means, uniform machining is ensured and there is no need to fear excessively sharp breaking of the edges. Injury to the operative is also impossible, since at least in the case of comparatively small gear wheels there is no danger of the fingers striking the rotary tool. By way of explanation it will be mentioned that the rotary cutting tool may be a grinding wheel, a milling cutter, a roller with a profile grinding band or the like.

In order to permit adapting the device conveniently to the requirements in each particular case, the invention provides that the support table can be raised and lowered, and the abutment, that is the rack bar, is arranged for tangential sliding movement relative to the rotary tool.

When the support table is arranged approximately at half the height of the rotary tool, that is at the height of its axis, the profile angles of the tool and the angles of the profile of the rack bar which faces the rotary tool are approximately equal, the profile angles of the rotary tool increasing correspondingly when the support table is raised. The said conformation and adaptation of the angles provides a warranty that the burring and breaking of the edges takes place uniformly. Whether one operates with a raised or lowered table, that is with a large or small profile angle, will depend chiefly upon the tooth shapes, upon the dimensions and upon the burring angles of the workpieces to be burred. In any case, with the table in its lowest position the advantage is obtained that the grinding forces are mainly transferred to the table and do not, as when the table is raised, counteract the pressure movement against the rack bar. This means for practical purposes that the burring can be performed more easily with the table placed low.

A useful middle course consists in such an arrangement that the workpiece comes into contact with the grinding wheel approximately at a point which lies on the upper arm of an angle of 45°, the apex of which coincides with the axis of rotation of the tool, and the lower arm of which is horizontal. With such an arrangement, the edge breaking angle will also generally lie in a favourable range.

In order that the invention may be more readily understood, reference is made to the accompanying drawings which illustrate diagrammatically and by way of example, one embodiment thereof, and in which.

Figure 1:
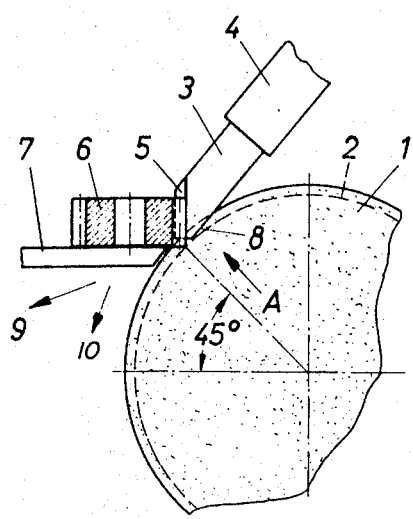
FIG. 1 shows a burring device in a partial side elevation.
Figure 2:
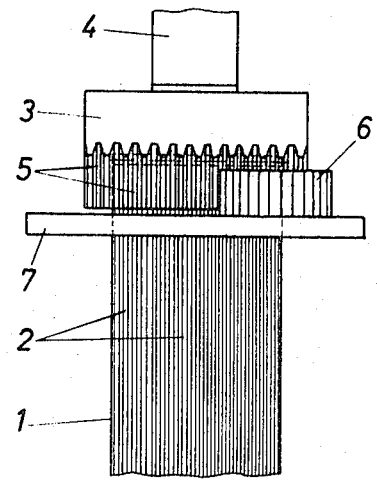
FIG. 2 shows the same device in front elevation.
Figure 3:
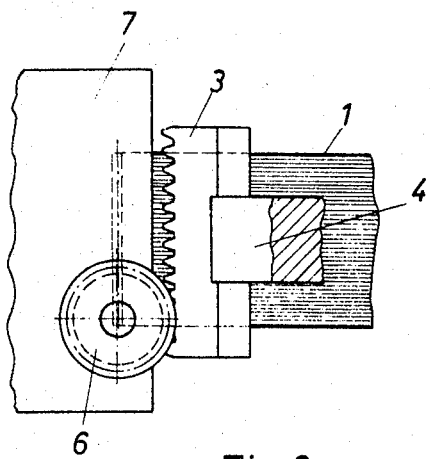
FIG. 3 shows the device in partial plan.
Figure 4:
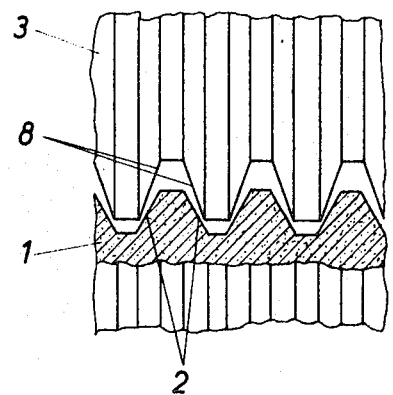
FIG. 4 shows a view in the direction of the arrow A in FIG. 1, with the grinding wheel sectioned.

Referring to FIGS. 1 to 3 of the drawings, the burring device comprises a grinding wheel 1 having a profiled peripheral surface 2, an abutment 3, which can be slid in a guide means 4 tangentially to the grinding wheel 1, and a vertically adjustable table 7. On its side remote from the grinding wheel 1, the abutment 3 is constructed as a rack bar 5, against which the workpiece, for example a gear wheel 6, can be rolled manually. Internally, on the side facing the grinding wheel 1, the abutment 3 is provided with a profile 8 which corresponds to the profiled peripheral surface 2 of the grinding wheel 1 (FIG. 4).

In FIG. 1 a central position of 45° as shown has been chosen for the position of the table 7. It is easy to see that with the table 7 placed lower than shown, the grinding forces urge the gear wheel 6 approximately in the direction of the arrow 9, whereas with the table raised the forces act in the direction of the arrow 10. However, not only the forces vary with the raising and lowering of the table, but also the angles of the profiles, as FIG. 4 shows. In this embodiment the grinding wheel 1 has a profile 2 with angles of approximately 60°, whereas the profile 8 of the abutment 3 is constructed with angles of 40°.

What I claim is:

1. A burring device for toothed workpieces, such as gear wheels having a predetermined tooth system, comprising a profiled rotary burring too having a cutting action, and the axis of which is disposed horizontally, a support table for the workpiece to be burred, and an abutment for the workpiece, wherein the abutment is constituted by a rack bar extending parallel to the axis of the rotary tool, said rack bar having on its side facing the gear wheel, a profile corresponding to the tooth system of the respective gear wheel, and having on its side facing the rotary tool, a profile corresponding to that of the rotary burring tool, the rack bar embracing the said profile of the rotary tool.

2. A device as claimed in claim 1 said rack bar having an abutment, wherein the support table is raisable and lowerable, and the rack bar abutment is arranged for sliding movement tangentially to the rotary tool.

3. A device as claimed in claim 1, wherein with the support table arranged approximately at half the height of the rotary tool, that is at the height of its axis, the profile angle of the rotary tool and the angles of the profiles of the rack bar facing the rotary tool are approximately equal, the profile angles of the rotary tool increasing correspondingly when the support table is raised.

References Cited

UNITED STATES PATENTS 2,860,453   11/1958   Frey _____ 51—105

LESTER M. SWINGLE, Primary Examiner

U.S. Cl. X.R.

51—287; 90—1.4